Nov. 17, 1970  C. W. JOHNSON  3,540,333
ORBITAL TUBE CUTTING MACHINE
Filed Jan. 21, 1969  4 Sheets-Sheet 1

INVENTOR,
CARL W. JOHNSON
BY
Wolf, Hubbard, Voit & Osann
ATTORNEYS.

Nov. 17, 1970  C. W. JOHNSON  3,540,333
ORBITAL TUBE CUTTING MACHINE
Filed Jan. 21, 1969  4 Sheets-Sheet 3

INVENTOR
CARL W. JOHNSON
BY
Wolfe, Hubbard, Voit & Osann
ATTORNEYS

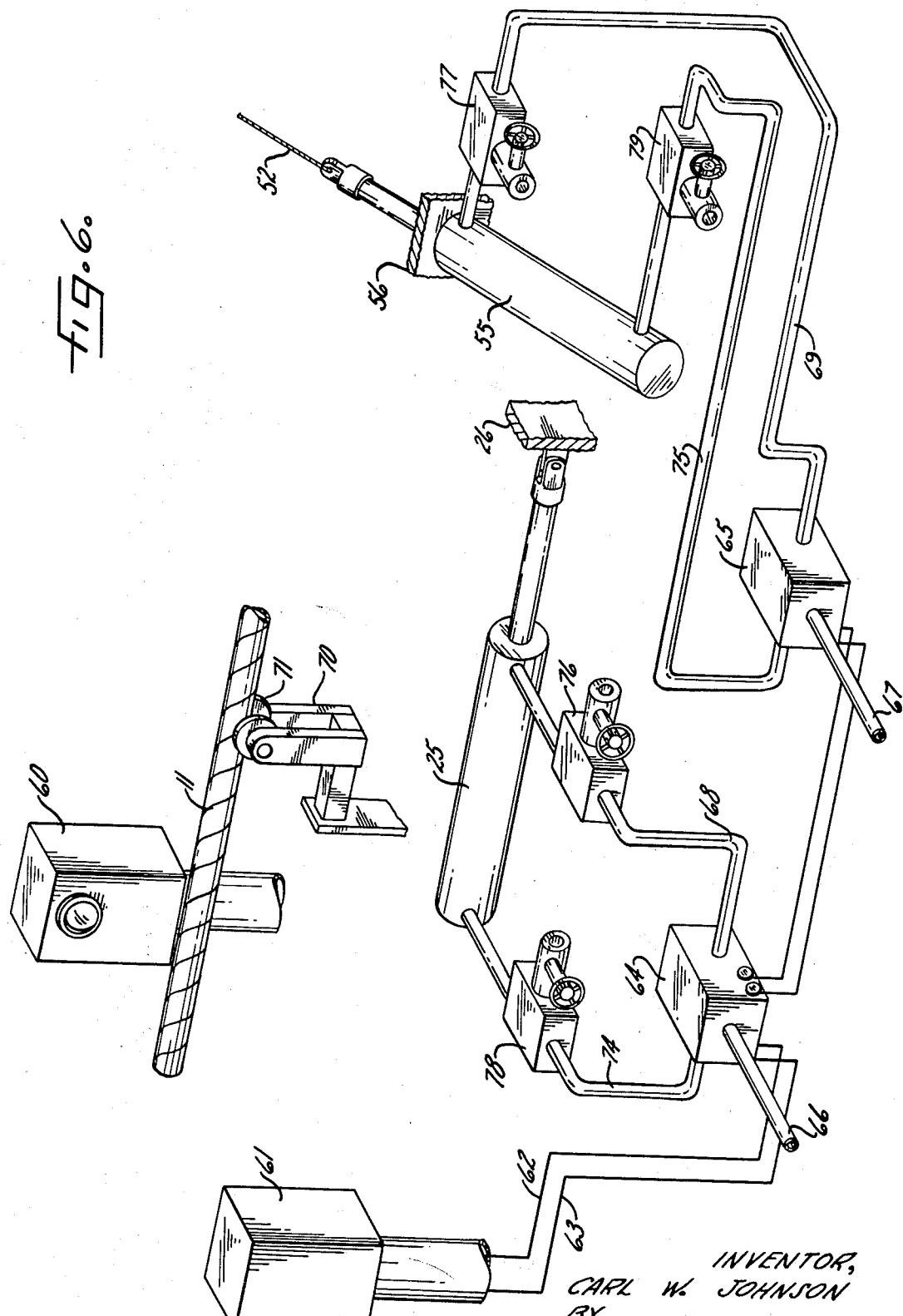

United States Patent Office 3,540,333
Patented Nov. 17, 1970

3,540,333
ORBITAL TUBE CUTTING MACHINE
Carl W. Johnson, Neenah, Wis., assignor to Kimberly-Clark Corporation, Neenah, Wis., a corporation of Delaware
Filed Jan. 21, 1969, Ser. No. 792,411
Int. Cl. B23b *37/00, 3/04, 5/14*
U.S. Cl. 82—53.1                    10 Claims

ABSTRACT OF THE DISCLOSURE

An orbital cutter for cutting thin-walled paper tubing is disclosed. The cutter includes a plurality of cutter wheels which are carried on lever arms pivotally mounted on the face of a rotating carrier wheel. A cinch cable encircling pulleys on the arms draws the cutter wheels into engagement with the tubing as the cutter is simultaneously advanced with the tubing.

BACKGROUND OF THE INVENTION

The present invention relates to tube cutting apparatus and more particularly concerns apparatus for cutting thin-walled paper tubing into predetermined lengths as it is slipped off the end of the mandrel of a helical tube winder.

In copending application Ser. No. 726,522, filed May 3, 1968, and entitled "Laminated Tube Structure and Method and Apparatus for Manufacturing Same" and in which I am one of the joint applicants, there is disclosed a method and apparatus for making a three-ply laminated tube structure particularly suited for use in the fabrication of tampon applicator devices or the like. The tube structure includes a glazed tissue inner ply having a relatively high fold endurance, a thin outer ply made of high quality, high strength paper having an extremely smooth coating on the exterior surface, and a relatively thick intermediate ply of short-fibered, porous, blotter-type paper having negligible fold endurance and interposed between and bonded to the inner and outer plies by a brittle, water soluble adhesive. As there disclosed, the thre strips of paper are supplied from separate supply roll unwind stands; under constant, low tension, to the fixed mandrel of a helical tube winding apparatus.

In the above-mentioned application, a rather simple tube cutting apparatus (which was not claimed to be particularly noval) was described and illustrated. That apparatus employed a single motor driven cutting blade brought into engagement with the tube by one actuator while another actuator simultaneously moved the motor and blade along with the tube in order to make a straight cut. While tube cutters of that type can be used for low quantity output, they are not satisfactory for high volume mass production purposes. One problem with such a cutter is that it subjects the tube to a force which tends to deflect it out of alignment with the mandrel. The difficulty this presents can be readily appreciated when it is borne in mind that the adhesive within the tubing is not yet set and the tubing is barely self-sustaining as it leaves the mandrel. Even minor deflections of the still "green" tubing cause distortions not only at the point of deflection but also upstream on the mandrel itself.

SUMMARY OF THE INVENTION

The primary aim of the present invention is to provide an improved cutter for cutting thin-walled paper tubing as it leaves the mandrel of a helical tube winder without causing distorting deflections to the still "green" tube.

It is a more specific object to provide an improved tube cutter which employs a plurality of symmetrically located orbital cutting edges which are quickly and uniformly brought into engagement with the tube in such a way that the forces on the tube are substantially balanced.

A more detailed object is to rotate an orbital cutter of the above type in the direction opposite to tube rotation to increase the effective cutting speed.

It is also an object to provide an improved tube cutter with means for sensing when a predetermined length of tubing has been fed into the cutter and to accurately control the cutting actuator and the shifting actuator in order to cut the tube off squarely in the seleced lengths.

Other objects and advantages of the invention will become more readily apparent upon reading the following detailed description and upon reference to the drawings in which:

FIG. 4 is an enlarged somewhat schematic view of a tube being cut by the cutting apparatus;

Figure 1:
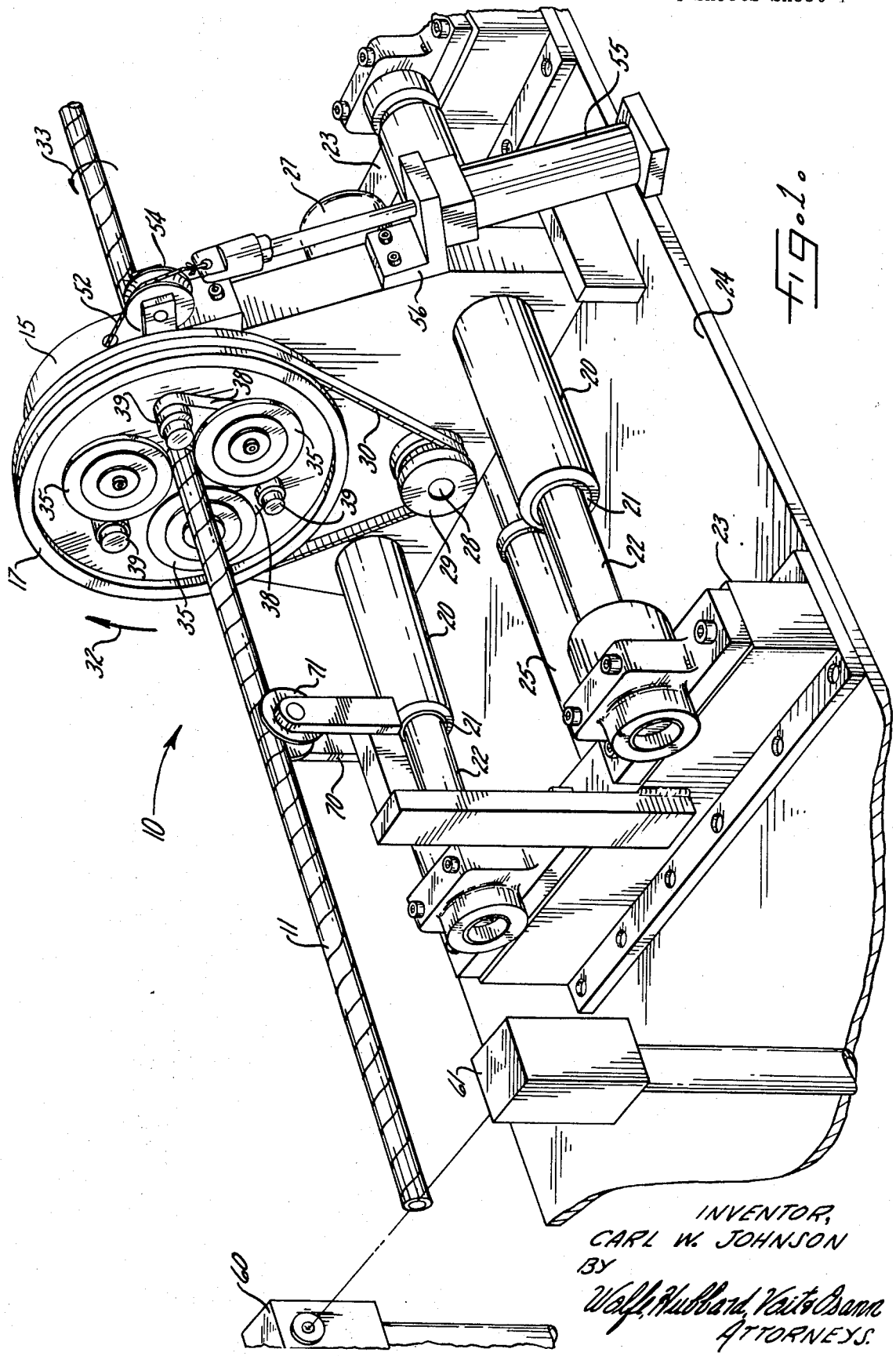
FIG. 1 is a perspective view of the orbital tube cutting apparatus of the present invention.

Turning now to the drawings, there is shown in FIG. 1 an orbital tube cutting machine 10 which embodies the features of the present invention. The illustrated machine 10 is particularly adopted for cutting thin-walled, multiple-ply paper tubing 11 as it is continuously discharged from the stationary mandrel 12 of a helical tube winding machine, indicated generally at 13 in FIG. 2. The tube winding apparatus 13 is not part of the present invention but reference may be made to the above-mentioned copending application Ser. No. 726,522 for the details of a suitable form of such apparatus.

For the present purposes it should suffice to say that multiple plies A, B and C of paper tape are fed to and helically wound around the stationary mandrel 12 to form a continuous tube 11 which is progressively slipped off the end of the mandrel in the direction of the arrow 14. As previously mentioned the central ply B of paper tape is coated on both sides with an adhesive which, when cured, bonds the central ply B to the inner and outer plies A and C. Although the adhesive is normally somewhat tacky when applied, it is generally not cured or set before the tubing 11 is slipped off the mandrel 12. Thus, the tubing is still "green" and quite fragile, particularly if made of very thin paper tape.

Figure 2:
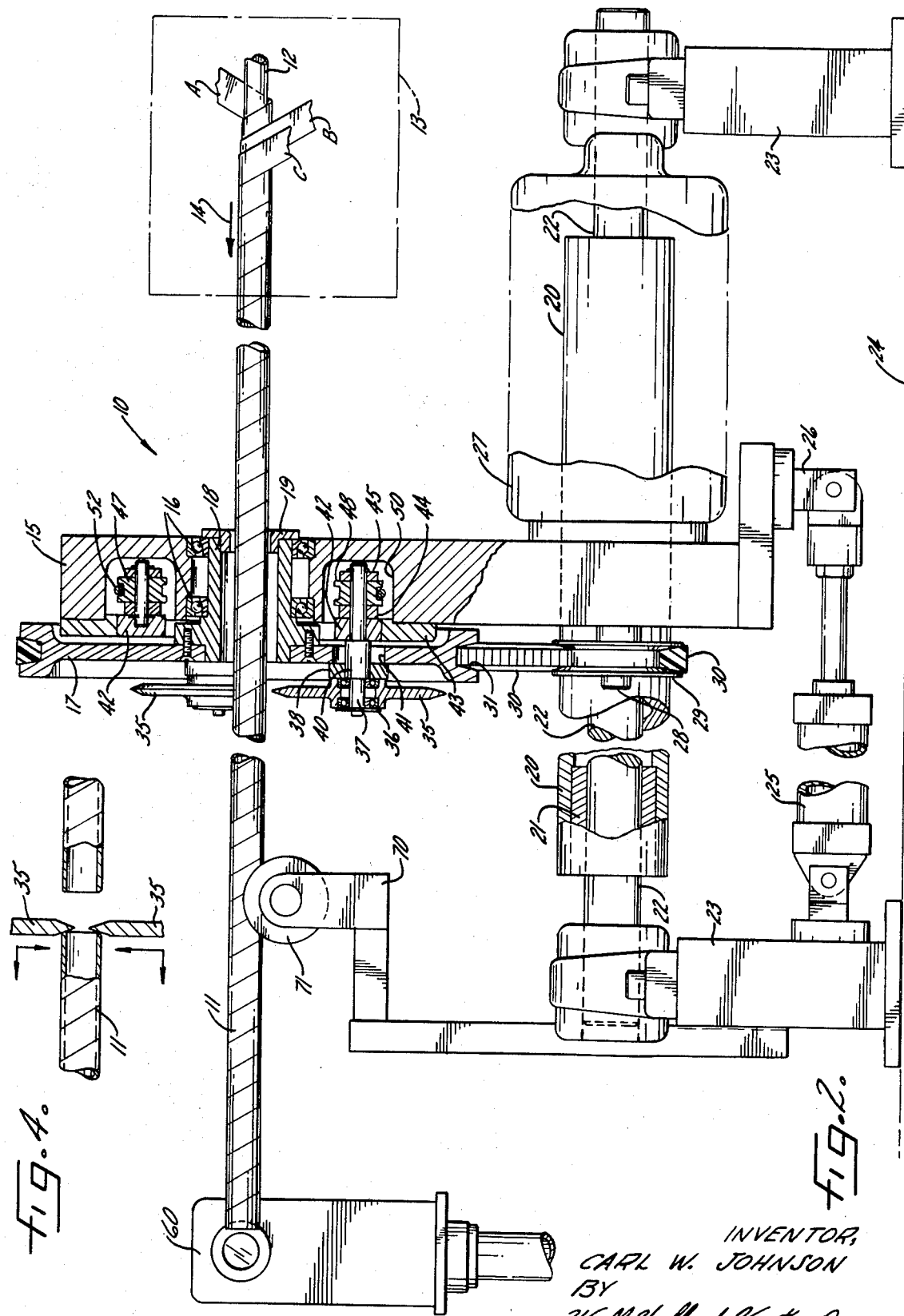
FIG. 2 is an enlarged fragmentary side elevation of the apparatus shown in FIG. 1, with certain portions shown in section.

The tube winding machine 10 includes a reciprocally mounted carrier plate 15 which journals in bearings 16 a rotatable carrier wheel 17, mounted on a hollow shaft 18 that carries a guide bushing 19 through which the tubing 10 is received from the tube winding apparatus 13 (see FIGS. 1 and 2). The carrier plate 15 is provided with a pair of tubular sleeves 20 fitted with bushings 21 at either end (only one of which is shown) adapted to ride on a pair of parallel guide ways or rails 22 secured by end blocks 23 to a suitable base or mounting surface 24. An actuator 25 is coupled between one of the end blocks 23 and a lug 26 on the carrier plate 15 and, when operated, slides the carrier plate on the rails 22.

Rotation of the carrier wheel 17 is provided by a motor 27 mounted on the carrier plate 15 and having a shaft 28 fitted with a pulley 29 which drives a belt 30 received in a peripheral groove 31 of the carrier wheel. For reasons to be discussed below, the carrier wheel 17 is rotated in the opposite direction to that of the tube 11 as it is discharged from the mandrel 12. Thus, as shown in FIG.

1, the carrier wheel rotates in the direction of arrow 32 while the tube rotates in the direction of arrow 33.

In accordance with the present invention, a plurality of sharpened cutter wheels 35 are mounted on the carrier wheel 17 for orbital movement around the tube 11. As shown in the drawings the illustrative machine 10 includes three cutter wheels 35 each journalled by bearings 36 on shafts 37 carried on the end of individual lever arms 38 whose other ends are pivoted at 39 on the carrier wheel. The shafts 37 are each formed with an enlarged collar portion 40 which extends through a still larger aperture 41 in the carrier wheel 17. Each shaft 37 also carries a roller element 42 butted against the collar 40 and adapted to normally ride on the inner peripheral surface of a circular track 43 secured to the carrier plate 15. A pair of arcuately shaped parallel plates 44 and 45 are secured to the end of each shaft 37 and a series of idler pulleys 47–49 are journalled between each pair of plates. A recess 50 in the carrier plate 15 affords space for rotation of the plates 44, 45 and pulleys 47–49.

Figure 3:
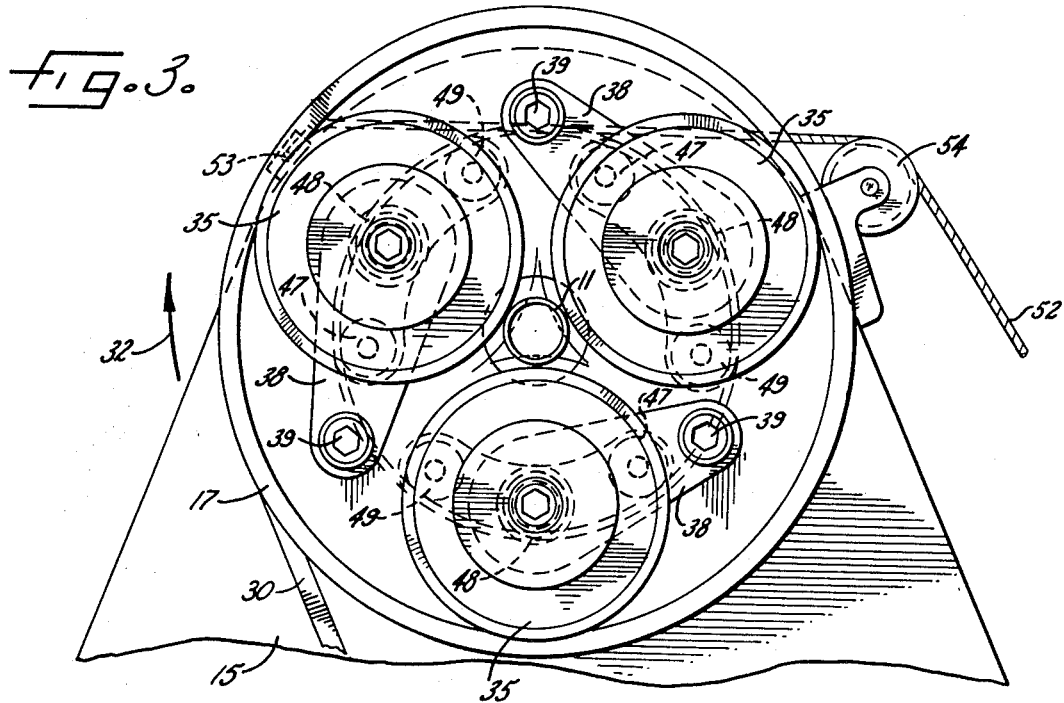
FIG. 3 is a fragmentary front elevation of the apparatus shown in FIG. 1.
Figure 5:
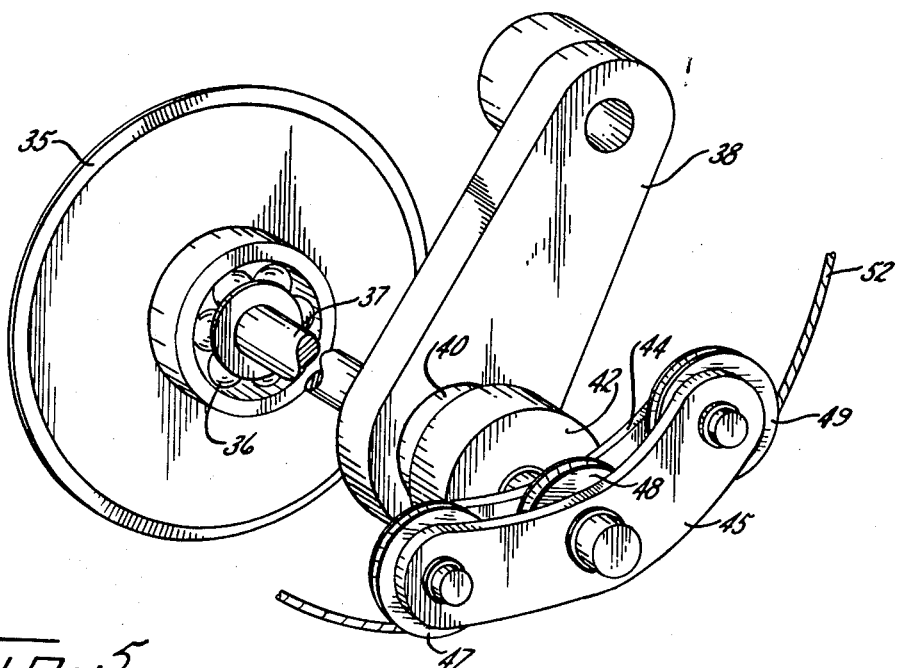
FIG. 5 is an enlarged perspective view of one of the cutter wheels and its operating arm; and, FIG. 6 is a schematic diagram of the electrical and pneumatic control circuits for the cutting apparatus.

Pursuant to the invention the cutter wheels 35 are uniformly drawn into engagement with the tube 11 by an actuating cable 52 which defines a loop within which the pulleys 47–49 rotate. One end of the cable is anchored at 53 to the carrier plate 15 (see FIG. 3) and the other end passes over a direction changing pulley 54 and is coupled to an actuator 55 secured to the carrier plate by a bracket 56. Upon energization of the actuator 55 the cable 52 is pulled reducing the size of its loop and swinging the arms 38 to bring the cutter wheels 35 into engagement with the tubing 11. Since the cutter wheels 35 are symmetrically located on the carrier wheel 17 and are uniformly drawn into engagement with the tube 11 by the cable 52, the forces on opposite sides of the tube are substantially equal thereby minimizing deflections of the tube which might cause distortions. Also by counter rotating the carrier wheel 17 with respect to the tubing 11 as indicated by arrows 32 and 33, respectively, the relative speed of rotation is increased thereby accelerating the cutting action of the orbiting cutting wheels 35 and minimizing the length of time the cutting wheels need to engage the tubing.

To insure that the tube 11 is cut off squarely, the carrier plate 15 is advanced at the same speed as the tubing 11 during the cutting operation. This is accomplished by energizing actuators 25 and 55 simultaneously. These actuators may take many different forms but in the preferred embodiment are double acting air cylinders operated under control of an electro-pneumatic circuit such as shown in FIG. 6. As shown here and in FIGS. 1 and 2, the tubing 11 is fed through the guide bushing 19 in the carrier wheel shaft 18 until it interrupts the beam of light projected from a light source 60 to a photocell controller 61 electrically connected by circuit wires 62 and 63 to solenoid control valves 64 and 65 for the cylinders 25 and 55, respectively.

As the light beam is interrupted, the controller 61 energizes the valves 64 and 65 to supply air under pressure from respective supply lines 66 and 67 through control lines 68 and 69 to the piston rod ends of the cylinders 25 and 55. This causes the cylinder 55 to pull the actuating cable 52 and simultaneously the cylinder 25 advances the carrier plate 15 in the direction the tubing is being fed.

In keeping with another feature of the invention, the projecting end of the tubing 11 is supported between the carrier wheel 17 and the photocell controller 61 by a support bracket 70 which journals a grooved guide wheel 71 on which the tubing rests. The guide wheel 71 is positioned inboard of the balancing point of the tubing cut off to the length determined by the initial spacing of the controller 61 from the orbiting cutter wheels 35. In other words, the guide wheel 71 is located closer to the carrier wheel 17 than to the controller 61. Thus, once the tubing is cut off by the cutter wheels 35, the end of the tubing projecting over the guide wheel 71 swings down and away from the light beam projected from the light source 60 to the controller 61. The cut tubing may then be received in a suitable container or discharge chute (not shown).

Following the cutting operation, solenoid valves 64 and 65 are operate to pressurize the head end of cylinders 25 and 55 through respective control lines 74 and 75. This may be accomplished by the controller 61 again receiving the light beam from the light source 60 as the tubing swings away or it may be accomplished by a time delay relay (not shown) connected in series between the controller and the valves 64, 65. In either event, the circuitry is conventional and well known to those skilled in the art.

To accurately control and synchronize the forward and return movement of the carrier plate 15 with the cutting action of the cutter wheels 35, the actuators 25 and 55 are preferably provided with adjustable control valves 76–79 in the respective rod end control lines 68 and 69 and head end control lines 74 and 75. By adjusting the valves 76–79 the rate of movement of the actuators 25 and 55 in each direction can be coordinated with each other. Desirably the forward movement of actuator 25 is controlled so that the carrier plate 15 advances at the same speed as the tube 11 during the cutting operation and advances slightly faster than the tube after the cut is made. Thus, the cutting wheels 35 actually push the cut tube forward a short distance on the guide wheel 71. On the return stroke, of course, it is desirable to have the cutting wheels 35 return to their open position well ahead of the return of the carrier plate 15 on guide rails 22. This avoids contact of the cutting wheels 35 with the tube 11 being fed through bushing 19.

While the invention has been disclosed herein in connection with certain preferred embodiments and procedures it is not intended to limit the invention to the specific apparatus illustrated and described. Rather, it is intended to cover all alternative and equivalent embodiments as fall within the spirit and scope of the appended claims.

I claim as my invention:

1. Apparatus for cutting thin-walled tubing comprising, in combination:
   a rotatable carrier wheel journalled for rotation on a carrier plate;
   said carrier wheel having a centrally located aperture therein through which said tubing is fed;
   said carrier plate mounted for reciprocation on a guide way parallel to said tubing;
   a plurality of cutter wheels respectively journalled for rotation on individual lever arms pivotally mounted on said carrier wheel;
   said lever arms each carrying at least one pulley thereon;
   a cable having one end anchored on said carrier plate and defining a loop encircling all of said pulleys;
   drive means for rotating said carrier wheel;
   a first actuator for pulling the other end of said cable to reduce the size of said loop and swing said cutting wheels into engagement with said tubing; and
   a second actuator for sliding said carrier plate on said guide way in timed relation to operation of said first actuator.

2. Apparatus as defined in claim 1 including means for sensing when a predetermined length of said tubing has been fed through said aperture and operative to energize said actuators.

3. Apparatus as defined in claim 2 including means on the output side of said aperture for supporting the free end of said tubing.

4. Apparatus as defined in claim 3 wherein said support is located inboard of the balancing point of a piece of said tubing cut to said predetermined length.

5. Apparatus as defined in claim 2 wherein said actuators are air cylinders and said sensing means includes a light and photocell with the photocell arranged to actuate a valve for said cylinders.

6. Apparatus as defined in claim 5 wherein said cylinders are double acting and said valve is operative to alternately pressurize opposite ends of said cylinders.

7. Apparatus as defined in claim 6 including pressure regulating means interposed between said valve and each end of said cylinders.

8. Apparatus as defined in claim 1 including three of said cutter wheels and lever arms and including three of said pulleys for each lever arm with said pulleys disposed with their axes perpendicular to an arcuate line having a curvature substantially the same as said loop.

9. Apparatus as defined in claim 1 wherein said carrier plate includes a pair of tubular supports having a bushing at either end and said guide way includes a pair of shafts on which said bushings are slidable.

10. Apparatus as defined in claim 1 wherein said drive means includes a motor mounted on said carrier plate and said carrier wheel is peripherally grooved to receive a belt driven by a pulley on said motor.

References Cited

UNITED STATES PATENTS

| | | | |
|---|---|---|---|
| 2,866,257 | 12/1958 | Stikeleather | 82—53.1 |
| 3,029,674 | 4/1962 | Southwell et al. | 82—53.1 X |
| 3,043,576 | 7/1962 | Diener | 82—53.1 X |
| 3,289,506 | 12/1966 | Morsbach et al. | 82—53.1 |
| 3,304,819 | 2/1967 | Pasternack | 82—53.1 |
| 3,310,855 | 3/1967 | Orioli | 82—53.1 X |

HARRISON L. HINSON, Primary Examiner

U.S. Cl. X.R.

82—101